United States Patent
Shah et al.

(10) Patent No.: US 8,249,546 B1
(45) Date of Patent: Aug. 21, 2012

(54) METHOD AND SYSTEM FOR IMPROVING ACCESS TO EMERGENCY SERVICES OVER A SHARED WIRELESS COMMUNICATIONS MEDIUM

(75) Inventors: Maulik Shah, Overland Park, KS (US); Jasinder Singh, Olathe, KS (US); Jason Sigg, Overland Park, KS (US); Ashish Bhan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 478 days.

(21) Appl. No.: 12/543,248

(22) Filed: Aug. 18, 2009

(51) Int. Cl.
*H04M 11/04* (2006.01)

(52) U.S. Cl. .................... 455/404.1; 455/41.2; 455/450; 455/466; 370/329

(58) Field of Classification Search ............... 455/404.1, 455/41.2, 466, 450; 370/329
See application file for complete search history.

(56) References Cited

U.S. PATENT DOCUMENTS

| | | | |
|---|---|---|---|
| 2005/0085257 | A1 | 4/2005 | Laird et al. |
| 2006/0023848 | A1* | 2/2006 | Mohler et al. ................... 379/41 |

OTHER PUBLICATIONS

D. Schneider, "The Silence of the Cell Phones," IEEE Spectrum, p. 14, Apr. 2009.

* cited by examiner

*Primary Examiner* — Amancio Gonzalez (57) ABSTRACT

Disclosed is a method and system for improving access to emergency services via a communication system including a shared wireless communications medium. A requesting wireless communications device receives dialed digits matching a predetermined dialed destination associated with an emergency contact and attempts to place a call to the dialed destination. Responsive to a failure of the attempt to place the call and to the matching, the requesting wireless communications device broadcasts a signal to cause at least one nearby wireless communications device to release at least a portion of communication system resources currently in use so as to thereby allow the released communication system resources to be subsequently used by the requesting wireless communications device. The requesting wireless communications device may then re-attempt the call with improved chances of connecting in light of the released resources.

20 Claims, 5 Drawing Sheets

METHOD AND SYSTEM FOR IMPROVING ACCESS TO EMERGENCY SERVICES OVER A SHARED WIRELESS COMMUNICATIONS MEDIUM

BACKGROUND

Emergency services calls may be placed for many reasons, including requesting police assistance, requesting fire-fighting assistance, or requesting emergency medical assistance. Emergency services calls may be placed by dialing a predetermined emergency telephone number. Several countries have established a unique emergency telephone number that may be dialed anywhere within that country to place an emergency services call.

In many cases, the emergency telephone number has fewer digits than telephone numbers used to place non-emergency calls. The use of fewer digits allows the emergency telephone number to be dialed more quickly and reduces the burden of having to remember a telephone number having more digits. As examples, the emergency telephone number in Japan is 119, and the emergency telephone number in the United Kingdom is 999. As another example, the emergency telephone number in the United States is 911. Other numbers may be used in other countries.

Different numbers may be provided for emergency calls from landline telephones versus wireless communications devices (WCDs). Alternatively, the same number may be provided to support emergency calls from both landline telephones and WCDs. In most parts of the United States, both landline telephones and WCDs, such as cell phones, may place emergency services calls by dialing the digits 9-1-1.

Despite advances in the general availability of emergency services, the ability of a particular wireless 9-1-1 caller to connect to a shared wireless network and ultimately to a public safety answering point (PSAP) remains dependent upon an availability of wireless capacity provided by local wireless service providers. There are many points in a typical wireless emergency call setup process that may act as a bottleneck to prevent a particular WCD from reaching a PSAP.

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet.

When a WCD, such as a cellular telephone or wirelessly-equipped computer, is positioned in a cell, the WCD communicates via an RF air interface with the base station antennae of a cell. Consequently, a communication path can be established between the WCD and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors) by performing functions such as assigning air interface traffic channels for use by WCDs in the coverage areas and orchestrating handoff of calls between coverage areas. And the switch and/or gateway, in turn, may control one or more base station controllers and may generally control wireless communications by performing functions such as receiving and processing call requests, instructing base station controllers when to assign traffic channels, paging WCDs, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Furthermore, each sector generally has a limited set of resources that can be allocated for use to serve WCDs in the sector. By way of example, each sector may define an air interface "access channel" on which WCDs can send "access probes" seeking to originate calls (e.g., voice calls, data sessions, and/or other "calls") or seeking to register their presence in the sector. The access channel may itself have limited capacity. (Further, if multiple access channels are provided, they may cooperatively have limited capacity.) For instance, the access channel may define timeslots in which WCDs can send access probes and may thus have a limited number of such timeslots. If numerous WCDs begin sending access probes in the same sector around the same time, the access channel of the sector can become congested and can ultimately reach a point where any further attempts to send access probes would result in "access probe collisions" and thus call setup failures (blocked calls) or other registration failures.

As another example, each sector may define an air interface "paging channel" on which the serving base station can send access probe acknowledgements and traffic channel assignment messages to served WCDs. And the paging channel may similarly have limited capacity. (Further, if multiple access channels are provided, they may cooperatively have limited capacity.) For instance, the paging channel may similarly define timeslots in which the base station can send various messages to particular WCDs. If the base station has numerous such messages queued to send, however, the paging channel can become congested and can thereby delay call setup or the like.

As yet another example, each sector may have a limited amount of transmission power for base station transmissions to served WCDs. That transmission power may need to be divided between numerous base station transmissions, such as transmissions to specific WCDs and broadcast transmissions to WCDs generally. At some point, if there is too much demand for base station transmissions, the power level allocated to particular transmissions may decrease to a point that the quality of the transmissions may suffer. Additionally, cells in a wireless network may exhibit "cell breathing," in which the more traffic a particular cell carries, the smaller the footprint radius becomes on both forward and reverse links that will support wireless traffic for that particular cell. The outer radius of the footprint, as measured from the base station antennae of the cell, is defined as the "cell edge" and determines the geographical service range of a cell at any given point in time (based on traffic load).

As still another example, each sector may have a limited number of traffic channels that its serving base station can assign at any given time (e.g., for concurrent use by numerous WCDs, or for other use). In CDMA, for instance, each traffic channel may be defined by encoding with a particular "Walsh code," yet the sector may have a limited pool of such Walsh codes. Consequently, if more than that number of traffic channels are needed at a given time, the base station would need to reject additional requests for traffic channel assignment, thus blocking new calls. Alternatively, in time division multiplex systems, such as TDMA or 1xEV-DO (e.g., the 1xEV-DO forward link for instance), traffic channels may be defined through interleaved timeslots on the air interface. In that case, if more than a threshold number of air interface communications occur at once, the base station may be unable to serve any additional communications due to the absence of any additional timeslots. As a result, communications may be blocked or degraded.

And as yet another example, each sector may have a limited supply of hardware addresses, such as Medium Access Control identifiers (MAC IDs) that its serving base station may assign for use to identify WCDs operating in the sector. This is typically the case in systems operating according to the 1xEV-DO protocol for instance. If more than a threshold number of WCDs are operating in the sector at once, the base station may exhaust its supply of MAC IDs and may then be unable to serve any additional WCDs that seek call initiation. Consequently, when additional WCDs request call initiation, the base station may need to reject their requests, again resulting in blocked calls.

Overview

As noted above, a wireless service provider allocates a fixed number of resources to support wireless calls originating from wireless communications devices (WCDs) in a particular geographical area. As a result, and despite advances made in supporting wireless emergency service calls, a WCD may be unable to initiate a wireless emergency phone call when there are insufficient resources available in the local wireless network to support the additional emergency phone call. Additionally, there may be bottlenecks in switches maintained by a wireless service provider or at portions of the wired-line network from the wireless service provider to a wired-line destination that prevent a call originating from a WCD from being completed.

Disclosed herein is a method and system for improving access to emergency services over a shared wireless communications medium. More specifically, disclosed is a method and system for reducing consumption of communication system resources by other nearby WCDs responsive to a failure to place an emergency wireless call at a requesting WCD. By reducing the consumption of communication system resources by other nearby WCDs involved in non-emergency phone calls, the resources available to the requesting WCD to place an emergency phone call can be increased and the chances of a failure to place an emergency wireless call at the requesting WCD can be correspondingly decreased.

For example, a requesting WCD may receive dialed digits matching a predetermined dialed destination (for example, an emergency contact destination such as 9-1-1) and attempt to place a call to the dialed destination over a shared communications medium. Responsive to a failure of the requesting WCD to connect to the dialed emergency contact destination, the WCD may attempt to free up wireless resources currently being consumed by other nearby WCDs. This could be accomplished by, for example, broadcasting a signal to cause other nearby WCDs to release communication system resources currently being used by the other nearby WCDs. The signal could also prevent other nearby WCDs from using the communication system resources for an amount of time after receiving the signal.

The signal broadcast by the requesting WCD could be any signal designed to cause other nearby WCDs to release shared communications medium resources. For example, the signal could be a forward link pilot signal broadcast at a predetermined pseudo-noise (PN) offset. Other types of signals could also be used.

The nearby WCDs could release shared communications medium resources responsive to receiving the signal by, for example, throttling a current connection's bandwidth usage, ending a current call, or shutting down. Preferably, the nearby WCDs would not take action to release shared communications medium resources if they are themselves involved in an emergency phone call. Advantageously, by releasing communication system resources currently being consumed by nearby WCDs involved in non-emergency communications, released communication system resources can be used by the requesting WCD to complete an emergency wireless phone call. Additionally, due to the "cell breathing" characteristic noted above, as traffic to a particular cell drops, the radius of the footprint served by the cell increases and the "cell edge" boundary increases in distance from the cell commensurate with the decrease in traffic to provide wireless service at a larger distance from the cell location. A WCD attempting to complete an emergency call at or slightly beyond a cell edge of a cell at a high traffic level may be within the cell edge once the traffic level at that cell decreases and may then be able to complete a previously uncompleted emergency wireless phone call.

Furthermore, the slight inconvenience of a bandwidth throttling, an involuntary call drop, or a WCD shutdown experienced by nearby WCD users is greatly outweighed by the increase in wireless resources available to the WCD that is attempting an emergency services phone call.

After broadcasting the signal to cause other nearby WCDs to release communication system resources, the requesting WCD may then re-attempt the call to the dialed destination (i.e., an emergency contact such as 9-1-1) over the shared communications medium. In light of the release of communication system resources by any and all other nearby WCDs receiving the signal, the requesting WCD will have an increased chance of completing the re-attempted phone call. By providing for a mechanism to cause other nearby WCDs conducting non-emergency communications to release communication system resources, the availability and robustness of wireless emergency services in general can be improved.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Introduction

Figure 1:
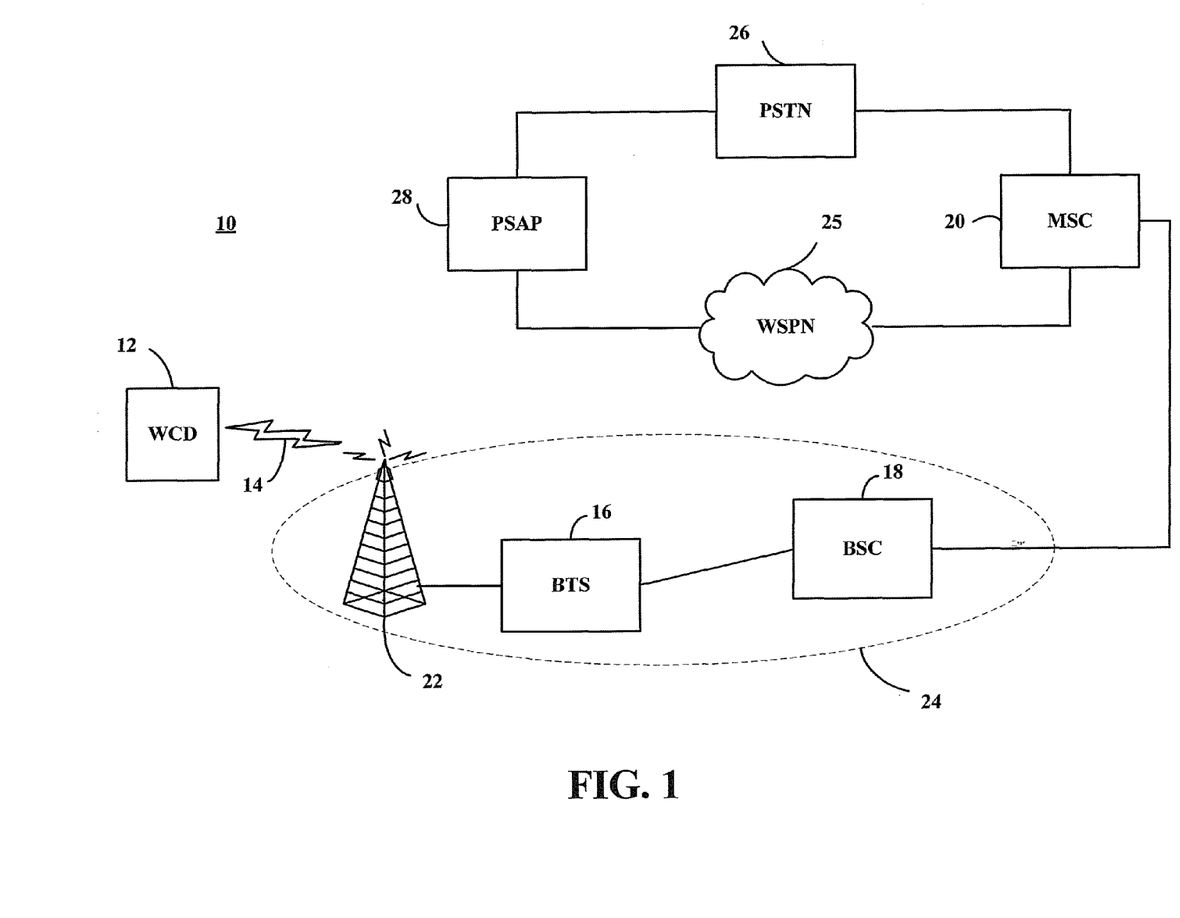
FIG. 1 is a simplified block diagram of a wireless communication system coupled to a public safety answering point, in accordance with example embodiments.

Referring now to the drawings, FIG. 1 is a block diagram of a communication system 10. In communication system 10, a wireless communications device (WCD) 12 may communicate with a mobile switching center (MSC) 20 via a radio air interface 14, a base transceiver station 16 (BTS), and a base station controller (BSC) 18. The combination of the BTS 16 and the BSC 18 is often referred to as a base station 24, and may be integrated with a radio tower structure 22. The MSC 20 may then be coupled to a public-safety answering point (PSAP) 28 through portions of a wireless service provider's network (WSPN) 25 and/or may be coupled to the PSAP 28 via a public switched telephone network (PSTN) 26.

User communications, such as digitized speech and TTY signals, and other types of data, may be transmitted from the base station 24 to a WCD 12 over a forward link of a radio channel. User communications may also be transmitted from the WCD 12 to the base station 24 over a reverse link of the radio channel. Other air interface protocols may use different labels for these radio links. Communications between the WCD 12 and the base station 24 may occur according to any of a variety of protocols. For example, the WCD 12 and base station 24 may communicate according to CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed.

The base station 24 may provide service to a geographic area surrounding the tower 22 defined as a cell. The cell may be further divided geographically into a number of sectors, each defined respectively by radiation patterns from directional antenna components of the respective base station 24. These sectors (which can be visualized ideally as pie pieces) can be referred to as "physical sectors," since they are physical areas of a cell site. Therefore, at any given instance, a WCD 12 in a wireless network will typically be positioned in a given physical sector and will be able to communicate with the PSAP 28 via the base station 24 serving that physical sector.

The base station 24 may broadcast a pilot signal on a forward channel in each of the sectors it serves, to allow WCDs 12 to detect the presence of the sector. When a WCD 12 is engaged in a call on a given sector, the WCD 12 may also scan for pilot signals in search of a strong enough signal to justify handoff from the current serving sector to a new sector broadcasting the stronger pilot signal. If the WCD 12 identifies such a stronger signal, the WCD 12 may then hand off to that new sector.

When a WCD 12 is in an idle mode, i.e., not currently engaged in an active call in a serving sector, the WCD 12 may monitor signal conditions (e.g., carrier-to-interference (C/I) ratio and/or a signal-to-interference-plus-noise ratio (SINR)) of a current serving sector and of pilot signals of various surrounding sectors, to determine a best (e.g., strongest) sector in which the WCD 12 should operate when a call or data connection needs to be initiated.

Once the WCD 12 identifies a desirable sector, the WCD 12 may then read a sector parameters message broadcast by the base station 24 serving that sector to learn more about the sector. Further, when the WCD 12 then seeks to initiate a call the WCD 12 would send an access probe on an access channel of that sector. If accepted, the network (e.g., the base station 24) may then assign an air interface traffic channel for the call, and the base station 24 may send a traffic channel assignment message via a paging channel to the WCD 12. The WCD 12 may then use the assigned traffic channel to engage in the requested call. In the event that the requested call is an emergency call, the BSC 18 and MSC 20 may route the call to the PSAP 28 via the PSTN 26 or the WSPN 25.

As set forth above, whether or not the WCD 12 actually completes the connection to the PSAP 28 will depend on the availability of communications resources in the communication system 10 to support the additional phone call.

For example, in a first link of the call over a wireless medium between the WCD 12 and base station 24, the ability of the WCD 12 to communicate with the base station 24 will depend on the availability of wireless medium resources. As set forth above, communications amongst different sectors are distinguished by those of other sectors by frequency, time, PN offset, or other various parameters. Therefore, in any one serving sector provided by a single base station 24, the communications bandwidth available to a particular WCD 12 is limited by the available frequencies, time slots, PN offsets, and/or other parameters supported in that sector.

Furthermore, the "access channel" on which the WCD 12 can send access probes seeking to originate calls may have limited capacity such that any further attempts to send access probes would result in access probe collisions and thus call setup failures or other registration failures. And the paging channel used by the base station 24 to acknowledge access probes and send channel assignment messages may have a similar limited capacity resulting in similar resultant call setup failures.

Additionally, if too many WCDs 12 attempt to connect to the base station 24 at the same time, the transmission power available to the base station 24 to serve each of the WCDs 12 may decrease to a level that causes the quality of transmissions suffer. Furthermore, and in light of the "cell breathing" characteristic noted above in which the footprint radius that will support wireless traffic for a particular cell decreases with an increase in the number of served WCDs, the service range for base station 24 may decrease to an extent that the requesting WCD 12 is no longer within range of the base station 24.

Each sector of the base station 24 may also be limited in the number of traffic channels it can assign at any given time. For example, in CDMA, each sector may have available a limited number of Walsh codes for encoding supported traffic channels. Once the pool of Walsh codes available to a particular sector of base station 24 are all in use, new calls requested from the WCD 12 in that sector may be rejected. In other systems, traffic channels may be defined through interleaved timeslots. If the number of WCDs being served causes an absence of additional available timeslots, new calls requested from the WCD 12 in that sector may be similarly rejected. Other traffic channel distribution mechanisms may have similar limitations.

As another example, the sector of the base station 24 serving the WCD 12 may have a limited number of hardware addresses (i.e., MAC IDs) to assign to the WCD 12. Once the supply of hardware addresses available to a particular base station 24 are exhausted, new calls requested from the WCD 12 in that sector may be rejected.

In addition to the wireless communications resources, there may be limited available wired-line communications resources existing in the wired-line connections between the BSC 18 associated with base station 24 and the PSAP 28. This can include, for example, switch throughput limitations at the MSC 20 and/or bandwidth availability in the PSTN 26 and/or WSPN 25.

In a situation where the requesting WCD 12 being served by a particular sector of base station 24 is attempting to make an emergency services call, it would be advantageous if the requesting WCD 12 initiating a call to the PSAP 28, responsive to failing to connect to the PSAP 28, could cause other nearby WCDs in the same or neighboring sectors to release communication system resources currently being used, to thereby allow the released communication system resources to be subsequently used by the requesting WCD 12 in a further attempt to connect to the PSAP 28.

Figure 2:
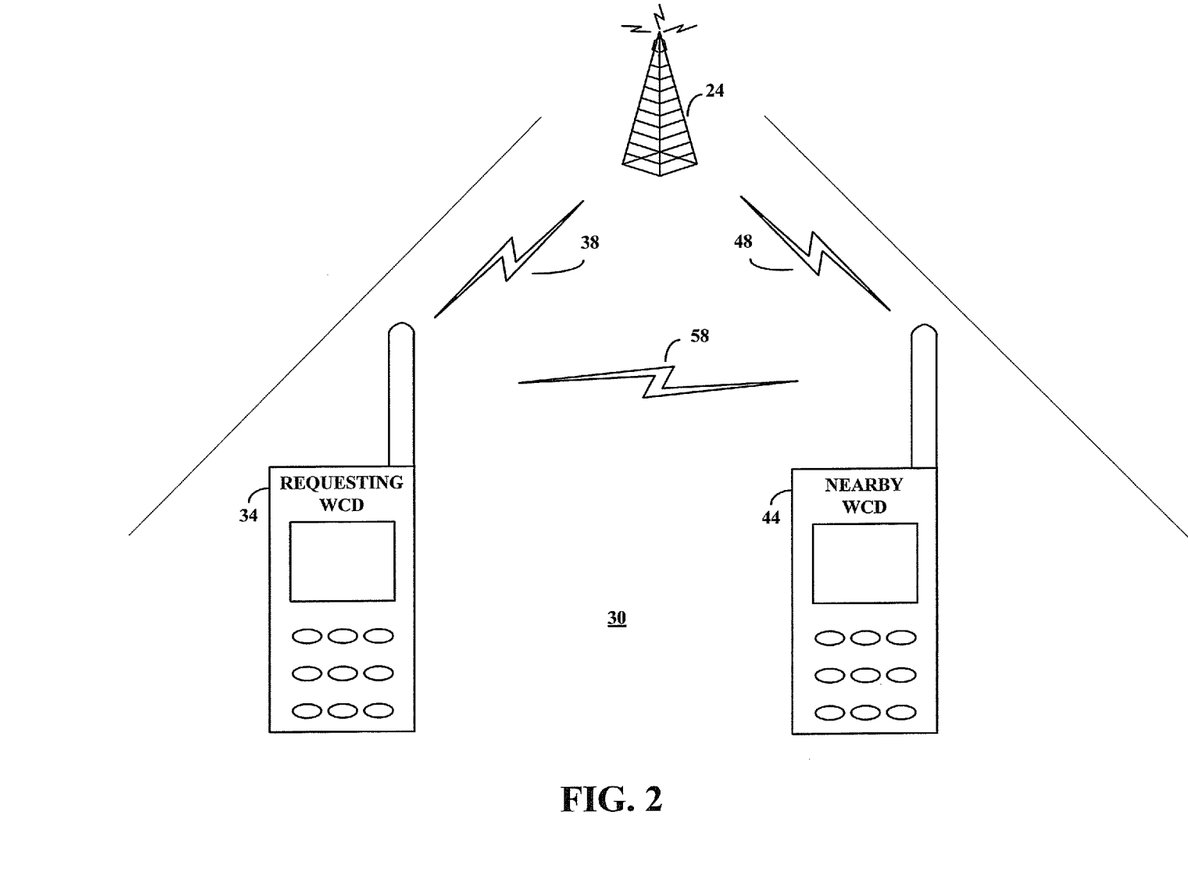
FIG. 2 is a simplified block diagram of the relationship between a requesting wireless communications device and a nearby wireless communications device in a wireless communication system, in accordance with example embodiments.

FIG. 2 sets forth an example wireless communications network including a base station 24 providing service in a service sector 30, a requesting WCD 34 initiating a phone call to a PSAP 28 via an air interface connection 38 with base station 24, and a nearby WCD 44 currently communicating with base station 24 via air interface connection 48. In the event that the requesting WCD 34 fails to connect to the PSAP 28, and in order to increase the communication system resources available for supporting an additional call to the PSAP 28, the requesting WCD 34 may send a signal to the nearby WCD 44 via air interface connection 58.

Air interface connection 58 is similar to air interface connections 38 and 48, but instead of connecting a wireless communications device 34, 44 to a base station 24, connects wireless communications device 34 directly to wireless communications device 44. The air interface connection 58 comprises a wireless medium that allows the wireless communications device 34 to communicate with the wireless communications device 44 via a radio channel. Communications over of the air interface connection 58 may occur according to any of a variety of protocols. For example, the requesting WCD 34 and the nearby WCD 44 may communicate according to CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed.

The nearby WCD 44 receiving the signal via air interface connection 58 may recognize the signal as a request to release communication system resources and may take corresponding action responsive to receiving the signal from requesting WCD 34.

For example, the nearby WCD 44 may throttle a bandwidth of a current connection, end a current call, or shut down and thereby release enough communication system resources to allow the requesting WCD 34 to complete its call attempt to the PSAP 28. Throttling may take the form of actively reducing an upload bandwidth used and/or a maximum number of reverse link traffic channels used in transferring voice and/or data traffic from the nearby WCD 44 to the base station 24.

The release of resources does not need to take the form of throttling a current connection, ending a current call, or shutting down, so long as the nearby WCD 44 releases some communication system resources that are currently being consumed. However, by completely shutting down, the nearby WCD 44 (i) may halt communications on the access and paging channels and thus free up capacity on the corresponding channels, (ii) may reduce the power being consumed by the base station 24 to communicate with the WCD 44 and correspondingly increase the power available at the base station 24 for handling a new connection, (iii) may release a traffic channel and thus make additional traffic channel capacity available to a new connection, (iv) may release a hardware address (such as a MAC ID) and thus make the hardware address available for a new connection, and (v) may release wired-line resources such as switch capacity at MSC 20 and thus make those wired-line resources available for a new connection. Other communication system resources may also be released.

Alternatively, instead of completely shutting down, a nearby WCD 44 may simply reduce the load it is imparting on the wireless network to release at least a portion of communication system resources it is consuming. For example, a nearby WCD 44 may, instead of shutting down, simply end a current bandwidth-intensive file download or audio/video stream, while remaining connected to the network to receive call pages and initiate voice calls. Alternately, the nearby WCD 44 may self-impose a pre-determined bandwidth usage limit and reduce current communication system resource usage accordingly.

The signal sent from the requesting WCD 34 to the nearby WCD 44 via air interface 58 may be any signal that a nearby WCD 44 is configured to detect while in idle mode and/or while currently involved in a phone call and to respond to by releasing communication system resources. For example, in a CDMA network, the signal could emulate a pilot beacon or control signal from a base station 24 that is normally used to advertise the availability of wireless service, but having a reserved signal attribute that would cause a receiving nearby WCD 44 to recognize the signal as a request to release communication system resources, and not as an advertisement of service.

More specifically, the base station 24 may broadcast a pilot beacon on the forward link of a radio channel at a predetermined PN offset so that WCDs in the range of the base station may receive notification that they can receive wireless services from that base station 24. A requesting WCD 34 operating in accordance with the same CDMA protocol and in the range of the base station 24 may broadcast its own signal on the same radio channel forward link, but at a different particular PN offset that nearby WCDs 44 are programmed to recognize as a request to release communication system resources. Other reserved signal characteristics could also be used to convey the instruction to release resources. For example, a particular reserved time slot or a particular reserved frequency could also be used, as long as the signal is provided on a same channel that is commonly scanned by idling and in-call WCDs.

After receiving the signal via the air interface 58, the nearby WCD 44 may respond to the requesting WCD 34 to report whether communication system resources were or were not released. For example, the nearby WCD 44 may broadcast a signal at the same or different reserved PN offset via air interface 58 to indicate to the requesting WCD 34 that communication system resources were released. The requesting WCD 34 could use this information in determining when to re-attempt the emergency phone call to the PSAP 28. Specifically, for example, the requesting WCD 34 may wait a predetermined amount of time before re-attempting the emergency phone call to the PSAP 28. However, if it detects a signal from a nearby WCD 44 indicating that communication system resources have been released, the requesting WCD 34 may re-attempt the emergency phone call to the PSAP 28 prior to the expiration of the predetermined amount of time.

2. Example Wireless Communications Device

Figure 3:
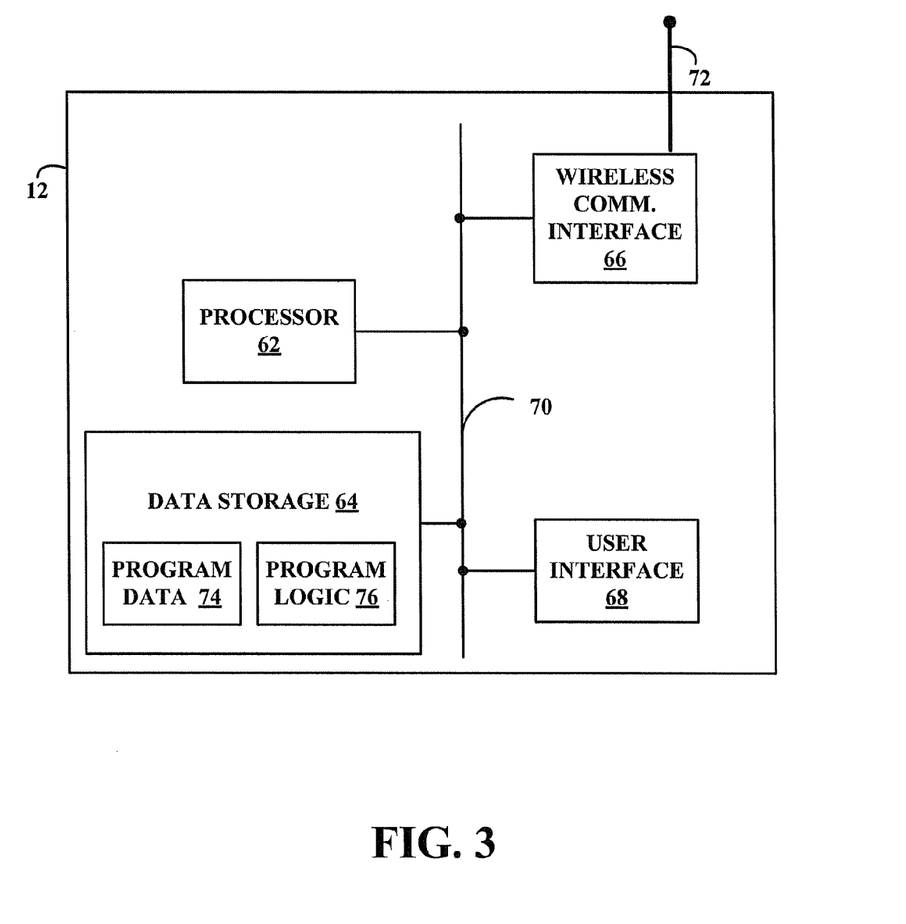
FIG. 3 is a block diagram of a wireless communications device for operating in the wireless communication systems of FIGS. 1 and 2.

FIG. 3 is a simplified block diagram showing functional components of an example WCD 12 capable of requesting the release of communication system resources responsive to failing to connect to a PSAP 28, and capable of detecting an instruction to release communication system resources and releasing communication system resources responsive to detecting the instruction. As shown in FIG. 3, the WCD 12 may include processor 62, data storage 64, wireless communication interface 66, and a user interface 68, and all linked together via a system bus, network, or other connection mechanism 70. An internal or external antenna 72 may be provided to aid in wireless communications with other devices.

The user interface 68 preferably functions to facilitate user interaction with the WCD 12. The user interface 68 may include a variety of input components, such as a touch screen, a navigation pad, a multi-functional button, a thumb wheel, a keyboard or keypad, and/or a microphone for instance. Additionally, the user interface 68 may include a variety of output components, such as a display screen and/or a speaker for instance. The user interface 68 may include signal processing components, such as analog-to-digital (A-D) and digital-to-analog (D-A) circuitry and other components for facilitating user interaction with the WCD 12 as well.

The wireless communication interface 66 preferably functions to communicatively couple the WCD 12 to one or more base stations 24 in a wireless service provider's network and supports the transmission of signals directly to nearby WCDs 12. In this respect, the communication interface 66 will preferably facilitate forward-link and reverse-link communication with the wireless service provider network and/or with nearby WCDs 12. The wireless communication interface 66 may take the form of a chipset adapted to facilitate wireless communication according to a desired protocol (including any one or more of those noted above) and/or any other form that provides for wireless communication. Other configurations are also possible.

The processor 62 may comprise one or more general purpose microprocessors and/or dedicated signal processors. (The term "processor" encompasses either a single processor or multiple processors that could work in combination.) Data storage 64, in turn, may comprise memory and/or other storage components, such as optical, magnetic, organic or other memory or disk/disc storage, which can be volatile and/or non-volatile, internal and/or external, and integrated in whole or in part with the processor 204. Data storage 64 preferably contains or is arranged to contain (i) program data 74 and (ii) program logic 76. Although these components are described herein as separate data storage elements, the elements could just as well be physically integrated together or distributed in various other ways. In a preferred example, the program data 74 would be maintained in data storage 64 separate from the program logic 76, for easy updating and reference by the program logic 76.

Program data 74 may contain information integral to the execution of the request to release communication system resources and/or to the detection of an instruction to release communication system resources and releasing communication system resources responsive to detecting the instruction.

For example, program data 74 may contain an indication of a reserved signal attribute for use by a WCD 12, when the WCD 12 is acting as a requesting WCD 34, in transmitting a signal to cause nearby WCDs 44 to release communication system resources. Similarly, the indication stored in program data 74 may be used when the WCD 12 is acting as a nearby WCD 44 in determining whether a detected signal is one intended to cause the nearby WCD 44 to release communication system resources. One example includes program data 74 storing the particular reserved PN offset in a CDMA communication system for use in conveying a request to release communication system resources from a WCD 12 acting as a requesting WCD 34 to a WCD 12 acting as a nearby WCD 44. In non-CDMA systems, the program data 74 may store other corresponding reserved signal attributes for use in conveying or receiving a request to release communication system resources, such as a particular reserved frequency or a particular reserved time slot.

The reserved signal attribute indication could be stored in a static, non-volatile read-only memory portion of program data 74, and thus be non-updateable. Or the indication could be stored in a writable memory portion of program data 74 and thus be updatable by a user or by the wireless service provider network. The reserved signal attribute indication could alternatively be stored in a data store separate from the program data 74 and program logic 76.

Program data 74 may also store a list of dialed digits that are associated with one or more emergency contacts. For example, the digits "9-1-1" may be stored in the list of dialed digits. Other numbers could also be stored in the list. For example, in some locations where separate numbers are provided for police, fire, etc., a plurality of numbers could be stored in the list of dialed digits associated with emergency services. Upon receiving dialed digits from the user interface 68, the processor 62 may compare the dialed digits to the digits stored in the list of dialed digits to determine if special processing should be applied to the current phone call. If, for example, the dialed digits received from the user interface 68 do not match any of the dialed digits in the list, normal call processing may be executed for the current phone call. In contrast, however, if the dialed digits received from the user interface 68 do match one of the dialed digits in the list, and responsive to failing to connect to an emergency destination associated with the dialed digits, a WCD 12 acting as a requesting WCD 34 may broadcast a signal instructing WCDs 12 acting as nearby WCDs 44 to release communication system resources.

Finally, program data 74 may also store a time value indicative of a time to refrain from requesting any additional communication system resources after receiving a signal instructing the WCD 12 acting as a nearby WCD 44 to release communication system resources. For example, this value could range from 1 second to 5 minutes, or more preferably 5 seconds to 60 seconds. Similar to the reserved signal attribute indication, the time value could also be stored in a static, non-volatile read-only portion of memory, and thus be non-updateable. Or the time value could be stored in a writable memory portion of the memory and thus be updatable by a user or by the wireless service provider network. The time value could also be stored in a data store separate from the program data 74 and program logic 76.

In contrast to program data 74, program logic 76 preferably comprises machine-language instructions that may be executed or interpreted by processor 62 to cause a particular WCD 12 to act as a requesting WCD 34 and/or a nearby WCD 44. Specifically, program logic 76 may comprise instructions for causing a requesting WCD 34 to, responsive to determining that received dialed digits match a predetermined dialed emergency destination and to a failing to connect to the dialed emergency destination, broadcast a signal to cause at least one nearby WCD 44 to release at least a portion of communication system resources currently being used by the at least one nearby WCD 44 so as to thereby allow the released communication system resources to be subsequently used by the requesting WCD 34. Program logic may further comprise instructions for causing a particular WCD 12 acting as a nearby WCD 44 to scan for service signals (e.g., pilot signals) and, responsive to detecting a signal having predetermined reserved attributes indicative of a request to release communication system resources, to release at least a portion of communication system resources currently being used.

Additionally, program logic 76 may comprise machine-language instructions for initiating and managing voice communications and file transfers with other wireless devices, including, for example, the base station 24.

It should be understood that the program logic 76 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware, or any combination thereof.

3. Example Process Flows

Figure 4:
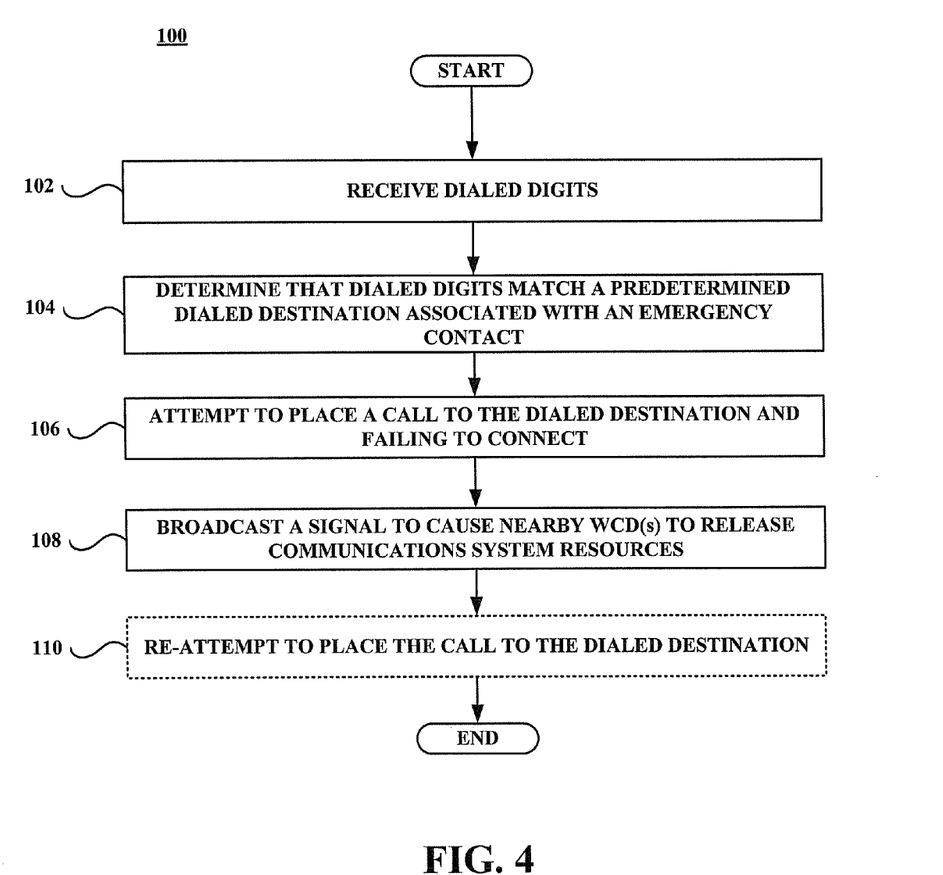
FIG. 4 is a flow chart of a first method, in accordance with an example embodiment.
Figure 5:
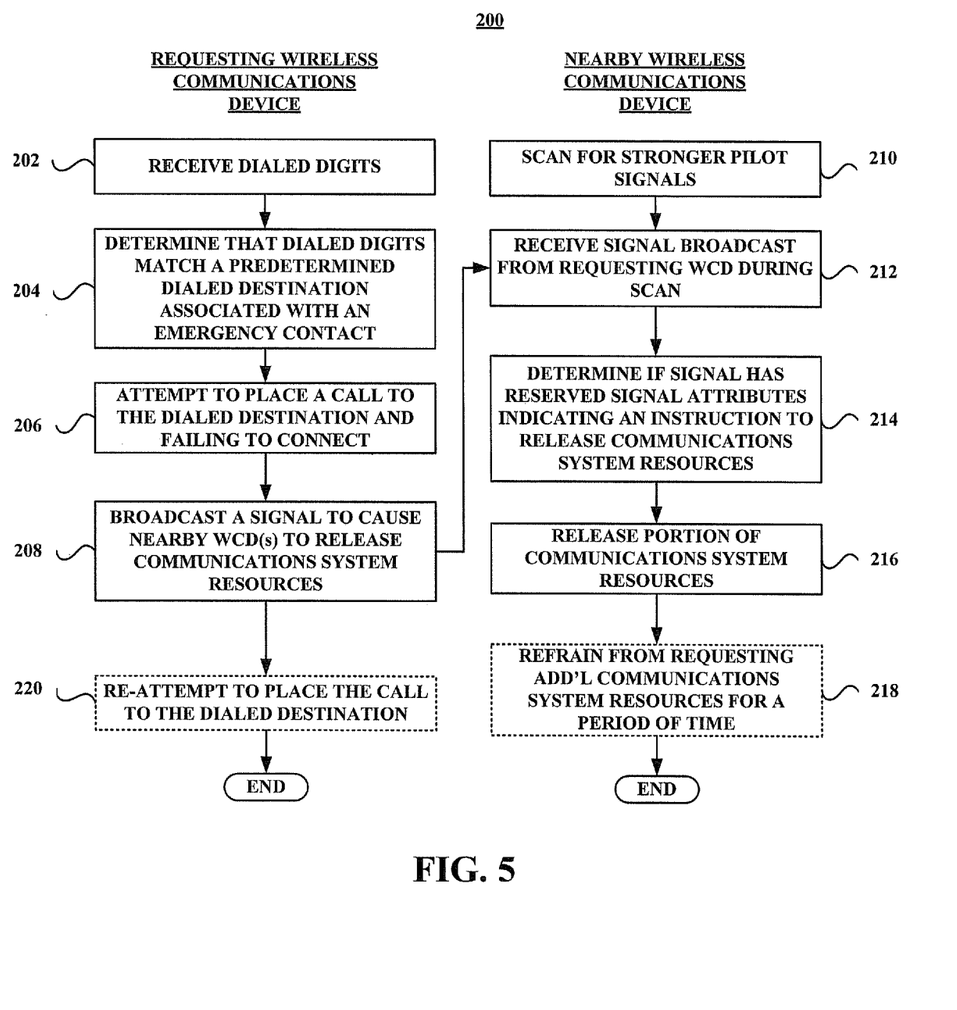
FIG. 5 is a flow chart of a second method, in accordance with an example embodiment.

FIGS. 4 and 5 are flow charts depicting example methods 100 and 200 for improving access to emergency services over a shared wireless communications medium. FIG. 4 sets forth a method 100 for execution at the requesting WCD 34. FIG. 5 sets forth a method 200 including the steps executed by both the requesting WCD 34 and a nearby WCD 44. The order of steps shown in FIGS. 4 and 5 is not necessarily restrictive. For example, in FIG. 4, the requesting WCD 34 may just as well perform step 104 (determining that dialed digits match a predetermined dialed destination associated with an emergency contact) after step 106 (attempting to place a call to the dialed destination and failing to connect). Other re-arrangements of steps are also possible.

As set forth in FIG. 4, a requesting WCD 34 receives dialed digits representing a desired dialed destination at a first step 102. The dialed digits may be received, for example, via user interface 68. Processor 62 may receive the dialed digits and compare them to a set of one or more predetermined dialed destinations to determine if the desired dialed destination is associated with an emergency contact, as indicated by block 104.

In an exemplary embodiment, "9-1-1" is one such predetermined dialed destination. However, other emergency services numbers or other types of dialed destinations may also be included within the list of predetermined dialed destinations. If it is determined that the dialed digits are not associated with an emergency contact, normal call processing routines may be executed by the processor 62 to connect the requesting WCD 34 to the desired dialed destination. On the other hand, if it is determined that the dialed digits do match a predetermined dialed destination associated with an emergency contact, special call processing routines are subsequently implemented in the event of a failure to connect to the dialed destination associated with the emergency contact, as set forth in steps 106-110. As set forth above, in an alternative embodiment, the determination of whether to implement special call processing could take place after step 106.

At step 106, the requesting WCD 34 attempts to place a call to the dialed destination. This may include, for example, the requesting WCD 34 seeking to initiate a call by sending an access probe on an access channel of the sector 30 that the WCD 34 is currently idling in. If sufficient wireless resources are available, the base station 24 serving the sector 30 that the WCD 34 is located in may then assign an air interface traffic channel for the call, and the base station 24 may send a traffic channel assignment message via a paging channel to the WCD 34. The WCD 34 may then use the assigned traffic channel to engage in the requested call. Further assuming the availability of sufficient wired-line resources, the MSC 20 may route the emergency call to the PSAP 28.

The requesting WCD 34 may, however, fail to connect to the PSAP 28 for any number of reasons. For example, the WCD 34 may not be in a communication range of a nearest base station 24, the WCD 34 may be within range of the base station 24 but the base station 24 may refuse a connection request, or the WCD 34 may establish a wireless connection with the base station 24 but the call still fails due to insufficient wired-line resources available to connect the call to the PSAP 28. Other call failure scenarios may be possible as well.

Responsive to the determining that the dialed digits match a predetermined dialed destination associated with an emergency contact and to the failing to connect to the predestined dialed destination, the requesting WCD 34 may broadcast a signal at step 108 instructing nearby WCDs 44 to release communication system resources. As set forth above, the signal could be any reserved signal characteristic that can be used to convey an instruction to release communication system resources.

For example, in a CMDA system, each channel in a CDMA signal is typically spread by one of 64 (numbered 0-63) orthogonal codes called Walsh codes. A pilot signal is normally broadcast by a base station 24 using Walsh code 0 at a particular PN offset. PN offsets used by serving cells are unique to a geographic area and serve to identify a particular base station 24 from other surrounding base stations. There are generally up to 512 unique PN offsets available to wireless network operators. One of these PN offsets may thus be removed from general use by base stations 24, and instead reserved for use as an indication of an instruction to release communication system resources. For example, a PN offset of 511 may be reserved to indicate a request to release communication system resources, and the signal broadcast in step 108 is broadcast using the CDMA protocol with a Walsh Code of 0 and a PN offset of 511. Of course, other PN offsets and Walsh codes could also be used consistent with the CDMA protocol. Furthermore, other reserved signal characteristics could be used consistent with the CDMA protocol.

Other signal characteristic could also be used in any one of the other protocols mentioned above. In a TDMA system, for example, the requesting WCD 34 may broadcast a signal at step 108 at a particular time slot that, when received by a nearby WCD 44, is recognized as an instruction to release communication system resources. Other communication system and signal attributes could be used as well.

Due to the limited power available in a WCD 34, the broadcast signal instructing nearby WCDs 44 to release resources may have a limited range and may only be detected by nearby WCDs 44 within, for example, a two-mile radius of the requesting WCD 34. Alternatively, the power level at which the signal is broadcast could be set at some intermediate level, so as to cause the range to extend only, for example, up to a one-mile radius from the requesting WCD 34. Of course, the actual range of the signal will depend on the characteristics of the environment surrounding the requesting WCD 34, and may be less than a maximum possible signal transmission range.

After broadcasting the signal in step 108, the requesting WCD 34 may wait a pre-determined amount of time before re-attempting the call, or may immediately re-attempt the call to the predetermined dialed destination. As noted above, a nearby WCD 44 may be programmed to broadcast a signal having a same or different reserved signal attribute as the signal received from the requesting WCD 34 in order to indicate whether communication system resources were released or not. In the event that the requesting WCD 34 detects such a signal broadcast from a nearby WCD 44, the requesting WCD 34 may cut short the pre-determined amount of time to wait before re-attempting the call to the predetermined dialed destination.

By broadcasting the signal instructing nearby WCDs 44 to release communication system resources, the requesting WCD 34 stands an improved chance of connecting with the PSAP 28 during second connection attempt. More specifically, the requesting WCD 34 may utilize some or all of the communication system resources released by nearby WCDs 44 in re-attempting to connect to the PSAP 28 after initially failing to connect. Additionally or alternatively, it may be possible that a cell edge of one or more base stations may expand to cover the requesting WCD 34 as a result of the increased power available to the corresponding one or more base stations that were serving the nearby WCDs 44 that released resources. The requesting WCD 34 would thus stand an improved chance of connecting with the PSAP 28 the second time for this reason also.

The requesting WCD 34 may re-attempt the call with improved chances of connecting with the PSAP 28 at step 110. Assuming sufficient wireless and wired-line resources are now available, the requesting WCD 34 will be connected with the PSAP 28 and allowed to complete the emergency phone call and summon emergency services.

FIG. 5 sets forth a process flow 200 including steps executed by the requesting WCD 34 and by the nearby WCD 44. While FIG. 5 illustrates only a single nearby WCD 44 for ease of reference, it is understood that each of a plurality of nearby WCDs 44 may be executing the corresponding process flow steps of FIG. 5. For example, there may be 2-20 nearby WCDs 44 within the broadcast range of the requesting WCD 34, all executing the corresponding steps set forth in FIG. 5.

Steps 202-208 substantially mirror steps 102-108 of the process set forth in FIG. 4, and the description set forth above regarding steps 102-108 is equally applicable to steps 202-208, and will not be addressed separately.

In step 210, the nearby WCD 44 is periodically scanning for stronger pilot signals. The nearby WCD 44 may be currently engaged in a phone call or data transfer in the sector 30 and scanning for a stronger pilot signal to hand-off to. In any event, the nearby WCD 44 is scanning for pilot signals within a broadcast range of the requesting WCD 34.

At step 208, similar to step 108 of FIG. 4, the requesting WCD 34 broadcasts a signal indicating a request to nearby WCDs 44 to release communication system resources. At step 212, the nearby WCD 44 receives the signal. The processor 62 of the nearby WCD 44 may then compare the signal attributes of the received signal to one or more signal attributes stored in the program data 74 at step 214 to determine whether the signal is a normal pilot signal or is a special signal having reserved signal attributes intended to indicate a request to release communication system resources. As set forth above, reserved signal attributes may include a particular reserved PN offset, a particular reserved frequency, or a particular reserved time slot, for example. If no match is found, normal processing of the signal may be executed by the nearby WCD 44. For example, the nearby WCD 44 may analyze the signal to determine if it indicates that a new or different service sector could provide a stronger service signal than the service sector 30 currently being used to receive service.

Alternately, if a match is found in step 214, the received signal is a special signal having reserved signal attributes and processing at the nearby WCD 44 continues to step 216. At this step, the nearby WCD 44 will release at least a portion of currently used communication system resources, if possible. As set forth above, the release of communication system resources could take the form of anything from throttling an existing voice or data connection to the more substantial step of actually powering off of the device. If the nearby WCD 44 is currently involved in an emergency communication itself, however, it may be prevented from releasing communication system resources.

Once the nearby WCD 44 has released at least some communication system resources, the nearby WCD 44 may take the additional step at step 218 of refraining from requesting any additional communication system resources for a period of time. As set forth above, the time value to refrain from requesting any additional communication system resources may be stored in program data 74. At step 218, the processor 62 of the nearby WCD 44 may retrieve the time value from program data 74, and refrain from requesting additional communication system resources for the period of time indicated by the time value.

After broadcasting the signal in step 208, and similar to the process set forth in FIG. 4, the requesting WCD 34 may wait a pre-determined amount of time before re-attempting the call, or may immediately re-attempt the call to the predetermined dialed destination. As noted above, the nearby WCD 44 may be programmed to broadcast a signal having a same or different reserved signal attribute as the signal received from the requesting WCD 34 in order to indicate to the requesting WCD 34 whether communication system resources were released or not. In the event that the requesting WCD 34 detects such a signal broadcast from a nearby WCD 44, the requesting WCD 34 may cut short the pre-determined amount of time to wait before re-attempting the call to the predetermined dialed destination in step 220.

At step 220, similar to step 110 of FIG. 4, the requesting WCD 34 may then re-attempt the call to the PSAP 28 with improved chances of connecting. Assuming sufficient wireless and wired-line resources are now available, the requesting WCD 34 will be connected with the PSAP 28 and allowed to complete the emergency phone call and summon emergency services. Advantageously, by providing for a mechanism to cause other nearby WCDs 44 conducting non-emergency communications to release communication system resources, the availability and robustness of wireless emergency services in general can be improved.

4. Conclusion

Example embodiments of the present invention have been described above. Those skilled in the art will understand, however, that changes and modifications may be made to these embodiments without departing from the true scope and spirit of the invention, which is identified by the claims.

We claim:

1. A method for connecting a requesting wireless communications device to an emergency contact via a communication system including a shared communications medium, comprising:

receiving dialed digits at the requesting wireless communications device;

the requesting wireless communications device determining that the received dialed digits match a predetermined dialed destination associated with the emergency contact;

the requesting wireless communications device attempting to place a call to the dialed destination over the shared communications medium and failing to connect to the dialed destination; and responsive to the determining that the dialed digits match the predetermined dialed destination and to the failing to connect to the dialed destination, the requesting wireless communications device broadcasting a signal over the shared communications medium to cause at least one nearby wireless communications device to release at least a portion of communication system resources currently being used by the at least one nearby wireless communications device to thereby allow the released communication system resources to be subsequently used by the requesting wireless communications device.

2. The method according to claim 1, further comprising the requesting wireless communications device re-attempting the call to the dialed destination over the shared communications medium after broadcasting the signal.

3. The method according to claim 1, wherein the requesting wireless communications device broadcasting the signal also causes the at least one nearby communications device to refrain from accessing the shared communications medium for an amount of time.

4. The method according to claim 3, wherein the requesting wireless communications device receives an indication from the at least one nearby wireless communications device that communication system resources were released and, responsive to receiving the indication, re-attempts the call to the dialed destination.

5. The method according to claim 1, wherein the emergency contact is an emergency services network.

6. The method according to claim 1, wherein the predetermined dialed destination is 9-1-1.

7. The method according to claim 1, further comprising:

receiving the signal broadcast by the requesting wireless communications device at a receiving wireless communications device; and responsive to receiving the signal, the receiving wireless communications device releasing at least a portion of shared communications medium resources currently being used.

8. The method according to claim 7, further comprising: the receiving wireless communications device also refraining from accessing the shared communications medium for an amount of time after receiving the signal.

9. The method according to claim 7, wherein the receiving wireless communications device releases the shared communications medium resources by shutting down.

10. The method according to claim 1, wherein the signal is broadcast on a forward link with a Walsh code indicative of a pilot signal.

11. The method according to claim 10, wherein the signal is broadcast at a reserved pseudo-noise (PN) offset.

12. The method according to claim 1, wherein determining that the dialed digits match the predetermined dialed destination associated with an emergency contact includes:

comparing the dialed digits to each of a plurality of predetermined dialed destinations locally stored in the requesting wireless communications device; and determining, based on the comparing, that the dialed digits match at least one of the predetermined dialed destinations.

13. The method according to claim 1, wherein the requesting wireless communications device broadcasts the signal at a power level sufficient to cause the signal to have a range of 0.1-0.5 miles from the requesting wireless communications device.

14. A wireless communications device for communicating over a shared communications medium comprising:

a processor; and a wireless communications interface, wherein the processor is configured to:

receive dialed digits and determine that the dialed digits match a predetermined dialed destination associated with an emergency contact;

attempt to place a call to the dialed destination over the shared communications medium via the wireless communications interface and fail to connect to the dialed destination, and responsive to the determination that the dialed digits match the predestined dialed destination and to the failure to connect to the dialed destination, broadcast a signal over the shared communications medium via the wireless communications interface to cause at least one nearby wireless communications device to release at least a portion of shared communications medium resources currently being used by the at least one nearby wireless communications device.

15. The device according to claim 14, wherein the processor is further configured to re-attempt the call to the dialed destination over the shared communications medium via the wireless communications interface after broadcasting the signal.

16. The device according to claim 14, wherein the signal is broadcast on a forward link with a Walsh code indicative of a pilot signal.

17. The device according to claim 16, wherein the signal is broadcast at a reserved pseudo-noise (PN) offset.

18. A wireless communication system for communicating over a shared communications medium comprising:

a first wireless communications device comprising a first processor and a first wireless communications interface; and a second wireless communications device comprising a second processor and a second wireless communications interface;

wherein the first processor is configured to:

receive dialed digits and determine that the dialed digits match a predetermined dialed destination associated with an emergency contact;

attempt to place a call to the dialed destination over the shared communications medium via the wireless communications interface and fail to connect to the dialed destination, and responsive to the determination that the dialed digits match the predestined dialed destination and to the failure to connect to the dialed destination, broadcast a signal over the shared communications medium via the wireless communications interface to cause the second wireless communications device to release at least a portion of shared communications medium resources currently being used by the second wireless communications device, wherein the second processor is configured to, responsive to receiving the signal from the first wireless communications device indicating an emergency need to access the shared communications medium, release shared communications medium resources currently being used by the second wireless communications device to thereby allow the released communication system resources to be subsequently used by the first wireless communications device.

19. The system according to claim 18, wherein the first processor is further configured to re-attempt the call to the dialed destination over the shared communications medium via the wireless communications interface after broadcasting the signal.

20. The system according to claim 18, wherein the first processor is further configured to broadcast the signal on a forward link with a Walsh code indicative of a pilot signal and at a reserved pseudo-noise (PN) offset.

* * * * *